United States Patent
Manoselvam et al.

(10) Patent No.: US 11,838,313 B2
(45) Date of Patent: Dec. 5, 2023

(54) ARTIFICIAL INTELLIGENCE (AI)-BASED MALWARE DETECTION

(71) Applicant: Accenture Global Solutions Limited, Dublin (IE)

(72) Inventors: Vicknesh Manoselvam, Singapore (SG); Boon Siew Seah, Singapore (SG); Kamal Mannar, Singapore (SG)

(73) Assignee: Accenture Global Solutions Limited, Dublin (IE)

(*) Notice: Subject to any disclaimer, the term of this patent is extended or adjusted under 35 U.S.C. 154(b) by 471 days.

(21) Appl. No.: 16/522,822

(22) Filed: Jul. 26, 2019

(65) Prior Publication Data
US 2021/0029157 A1   Jan. 28, 2021

(51) Int. Cl.
*H04L 9/00* (2022.01)
*H04L 9/40* (2022.01)
*G06N 3/08* (2023.01)

(52) U.S. Cl.
CPC ........... *H04L 63/1441* (2013.01); *G06N 3/08* (2013.01); *H04L 63/1416* (2013.01)

(58) Field of Classification Search
CPC ............. H04L 63/1441; H04L 63/1416; H04L 63/101; G06N 3/08; G06N 3/0454; G06N 3/088; G06N 20/00; G06F 21/554
See application file for complete search history.

(56) References Cited

U.S. PATENT DOCUMENTS

| | | | |
|---|---|---|---|
| 2019/0058736 A1* | 2/2019 | Stupak | H04L 63/20 |
| 2019/0087692 A1* | 3/2019 | Ding | G06F 18/22 |
| 2019/0188212 A1* | 6/2019 | Miller | H04L 63/145 |
| 2020/0007548 A1* | 1/2020 | Sanghavi | H04L 63/0209 |
| 2020/0358817 A1* | 11/2020 | Ahluwalia | H04L 61/5046 |

OTHER PUBLICATIONS

Azab et al., "Machine learning based Botnet Identification Traffic," Proceedings of 15th IEEE International Conference on Trust, Security and Privacy in Computing and Communications (IEEE TrustCom—2016), Tianjin, China, Aug. 23-26, 2016, 1788-1894.

Ding et al., "Machine Learning for Cybersecurity: Network-based Botnet Detection Using Time-Limited Flows," Caltech Undergraduate Research Journal, Jul. 11, 2018, retrieved from URL<https://curj.caltech.edu/2018/07/11/machine-learning-for-cybersecurity-network-based-botnet-detection-using-time-limited-flows/>, 13 pages.

* cited by examiner

*Primary Examiner* — Daniel B Potratz
*Assistant Examiner* — Syed M Ahsan
(74) *Attorney, Agent, or Firm* — Fish & Richardson P.C.

(57) ABSTRACT

Implementations include receiving flow data representative of communication traffic of the network, determining that at least one blacklisted Internet protocol (IP) address is present in the flow data, and in response: providing a set of high-dimensional flow representations of network traffic by processing historical flow data through a deep learning (DL) model, providing a set of low-dimensional flow representations of the network traffic based on the set of high-dimensional flow representations, and labeling at least a portion of the set of low-dimensional flow representations to provide a sub-set of labeled low-dimensional flow representations and a sub-set of unlabeled low-dimensional flow representations, and identifying a host associated with an unlabeled low-dimensional flow representation as a potentially malicious host, and in response, automatically executing a remedial action with respect to the potentially malicious host.

24 Claims, 5 Drawing Sheets

ARTIFICIAL INTELLIGENCE (AI)-BASED MALWARE DETECTION

BACKGROUND

Malicious users can attack devices and networks. In some instances, attacks are executed to disrupt operations. In some instances, attacks are executed to steal sensitive information. Such attacks can be unleashed using so-called command and control (also referred to as C&C or C2), which can include a centralized server or computer that communicates with an infected host. In some examples, a malicious user (e.g., hacker) can use the C&C to issue commands to control malware and/or bots in an infected network. Malware can be described as software designed to cause damage to a computer, server, client, or computer network after being covertly installed. Example malware can include a bot (short for robot), which can be described as an automated process that interacts with network services. A malicious bot (e.g., a bot used for malicious intent) can be described as self-propagating malware designed to infect a host and connect back to the C&C.

Security systems have been developed to identify and monitor malicious activities. So-called threat intelligence (TI) feeds provide a continuous stream of data representative of malicious activity. In some instances, a security service can subscribe to a TI feed to be made aware of malicious activity that is occurring (e.g., in other networks) and/or to report malicious activity (e.g., in the network the security system is monitoring). TI feeds, however, typically provide information of known malicious activities. That is, malicious activity occurs and is then reported to a TI feed for publication.

Some types of attacks are harder to detect than others. For example, so-called zero-day attacks target unknown security vulnerabilities in computer software that have not yet been addressed (e.g., a patch has not been released, application developers are unaware of the vulnerability). Current techniques for detecting zero-day attacks are limited and/or ineffective.

SUMMARY

Implementations of the present disclosure are generally directed to detection of zero-day attacks. More particularly, implementations of the present disclosure are directed to zero-day attacks based on historic command and control (C&C) communications.

In some implementations, actions include receiving flow data representative of communication traffic of the network, determining that at least one blacklisted Internet protocol (IP) address is present in the flow data, and in response: providing a set of high-dimensional flow representations of network traffic by processing historical flow data through a deep learning (DL) model, providing a set of low-dimensional flow representations of the network traffic based on the set of high-dimensional flow representations, and labeling at least a portion of the set of low-dimensional flow representations to provide a sub-set of labeled low-dimensional flow representations and a sub-set of unlabeled low-dimensional flow representations, and identifying a host associated with an unlabeled low-dimensional flow representation as a potentially malicious host, and in response, automatically executing a remedial action with respect to the potentially malicious host. Other implementations of this aspect include corresponding systems, apparatus, and computer programs, configured to perform the actions of the methods, encoded on computer storage devices.

These and other implementations can each optionally include one or more of the following features: providing a set of low-dimensional flow representations of the network traffic based on the set of high-dimensional flow representations includes processing the set of high-dimensional flow representations using one of t-distributed stochastic neighbor embedding (t-SNE) and principal component analysis (PCA) to provide the set of low-dimensional flow representations; identifying a host associated with an unlabeled low-dimensional flow representation as a potentially malicious host includes: executing k-nearest neighbor (k-NN) clustering over the sub-set of labeled low-dimensional flow representations and the sub-set of unlabeled low-dimensional flow representations, and classifying the unlabeled low-dimensional flow representation as potentially malicious in response to the unlabeled low-dimensional flow representation being clustered with one or more labeled low-dimensional flow representations; labeling at least a portion of the set of low-dimensional flow representations includes determining that a low-dimensional flow representation is associated with a known malicious host and, in response, labeling the low-dimensional flow representation to provide a labeled low-dimensional flow representation included in the sub-set of labeled low-dimensional flow representations; determining that at least one blacklisted IP address is present in the flow data includes: receiving threat information from one or more threat information (TI) feeds, comparing blacklisted IP addresses in a set of blacklisted IP addresses provided in the threat information to IP addresses included in the flow data, and determining that an IP address included in the flow data matches a blacklisted IP address; actions further include extracting the historical flow data in response to determining that the at least one blacklisted IP address is present in the flow data; automatically executing a remedial action with respect to the potentially malicious host includes configuring a firewall system to at least partially block communication with the potentially malicious host; and each low-dimensional flow representation includes a three-dimensional (3D) flow representation.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to detection of zero-day attacks. More particularly, implementations of the present disclosure are directed to zero-day attacks based on historic command and control (C&C) communications. In some implementations, actions include receiving flow data representative of communication traffic of the network, determining that at least one blacklisted Internet protocol (IP) address is present in the flow data, and in response: providing a set of high-dimensional flow representations of network traffic by processing historical flow data through a deep learning (DL) model, providing a set of low-dimensional flow representations of the network traffic based on the set of high-dimensional flow representations, and labeling at least a portion of the set of low-dimensional flow representations to provide a sub-set of labeled low-dimensional flow representations and a sub-set of unlabeled low-dimensional flow representations, and identifying a host associated with an unlabeled low-dimensional flow representation as a potentially malicious host, and in response, automatically executing a remedial action with respect to the potentially malicious host.

To provide context for implementations of the present disclosure, and as introduced above, malicious users can attack devices and networks using so-called C&C (or C2), which can include a centralized server or computer. In some examples, a malicious user (e.g., hacker) can use the C&C to issue commands to control malware and/or bots. Malware can be described as software designed to cause damage to a computer, server, client, or computer network after being covertly installed. Example malware includes a bot (short for robot), which can be described as an automated process that interacts with network services. A malicious bot (e.g., a bot used for malicious intent) can be described as self-propagating malware designed to infect a host and connect back to the C&C.

Security systems have been developed to identify and monitor malicious activities. So-called threat intelligence (TI) feeds provide continuous streams of data representative of malicious activity. In some instances, a security service can subscribe to a TI feed to be made aware of malicious activity that is occurring (e.g., in other networks) and/or to report malicious activity (e.g., in the network the security system is monitoring). TI feeds, however, typically provide information of known malicious activities. That is, malicious activity occurs and is then reported to a TI feed for publication. Some types of attacks are harder to detect than others. For example, so-called zero-day attacks target unknown security vulnerabilities in a computer software that have not yet been addressed (e.g., a patch has not been released, application developers are unaware of the vulnerability). Current techniques for detecting zero-day attacks are limited and/or ineffective.

Figure 1:
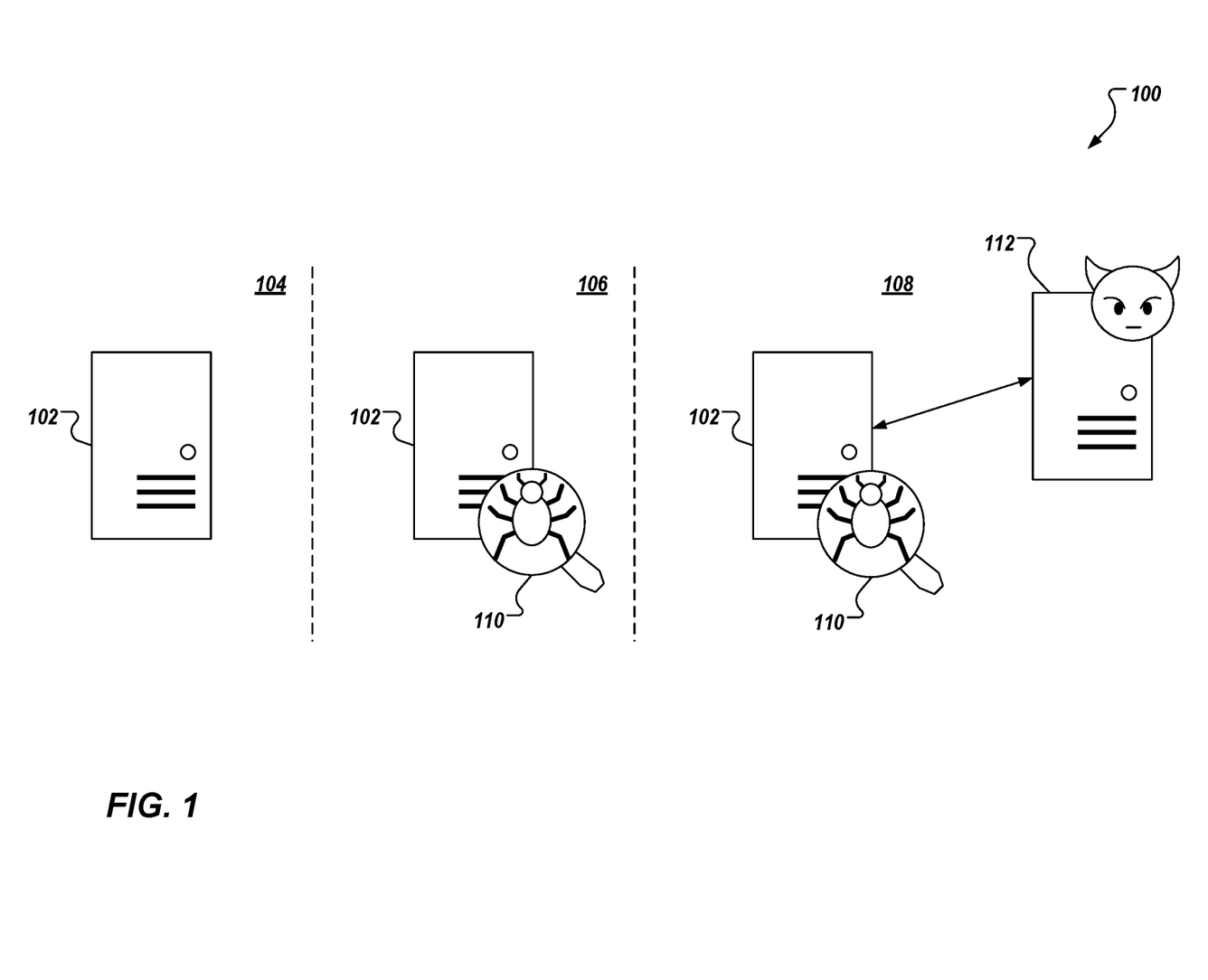
FIG. 1 depicts example stages of malware infection including command and control.

FIG. 1 depicts example stages 100 of malware infection including C&C. In the example of FIG. 1, a host 102 (e.g., a server, a computer) is depicted in a healthy stage 104, an infected stage 106, and an infected and communicating stage 108. In the healthy stage 104, the host 102 is uninfected and executes as intended using expected computer software. In the infected stage 106, the host 102 is infected with malware 110, which is undetected. In the infected and communicating stage 108, the malware 110 infecting the host 102 causes the host 102 to communicate with a C&C 112 operated by a malicious user (e.g., hacker). This communication can include malicious activity (e.g., data exfiltration from the host 102).

Implementations of the present disclosure are generally directed to detection of zero-day attacks. More particularly, implementations of the present disclosure are directed to zero-day attacks based on historic flow data that includes C&C communications (e.g., C&C communications with known malicious hosts). More particularly, implementations of the present disclosure provide a zero-day attack monitoring (ZAM) platform that provides artificial intelligence (AI)-based malware detection to detect zero-day attacks. In some implementations, and as described in further detail herein, a DL model provides a representation of flow data with one or more known malicious C&Cs, also referred to herein as known malicious hosts, that is used to identify one or more hosts as potentially malicious, referred to herein as potentially malicious hosts, based on communication patterns with the one or more potentially malicious hosts. In some implementations, one or more users are alerted to the identification of the one or more malicious hosts. In some implementations, a firewall system is automatically configured to block communications with the one or more potentially malicious hosts.

Figure 2:
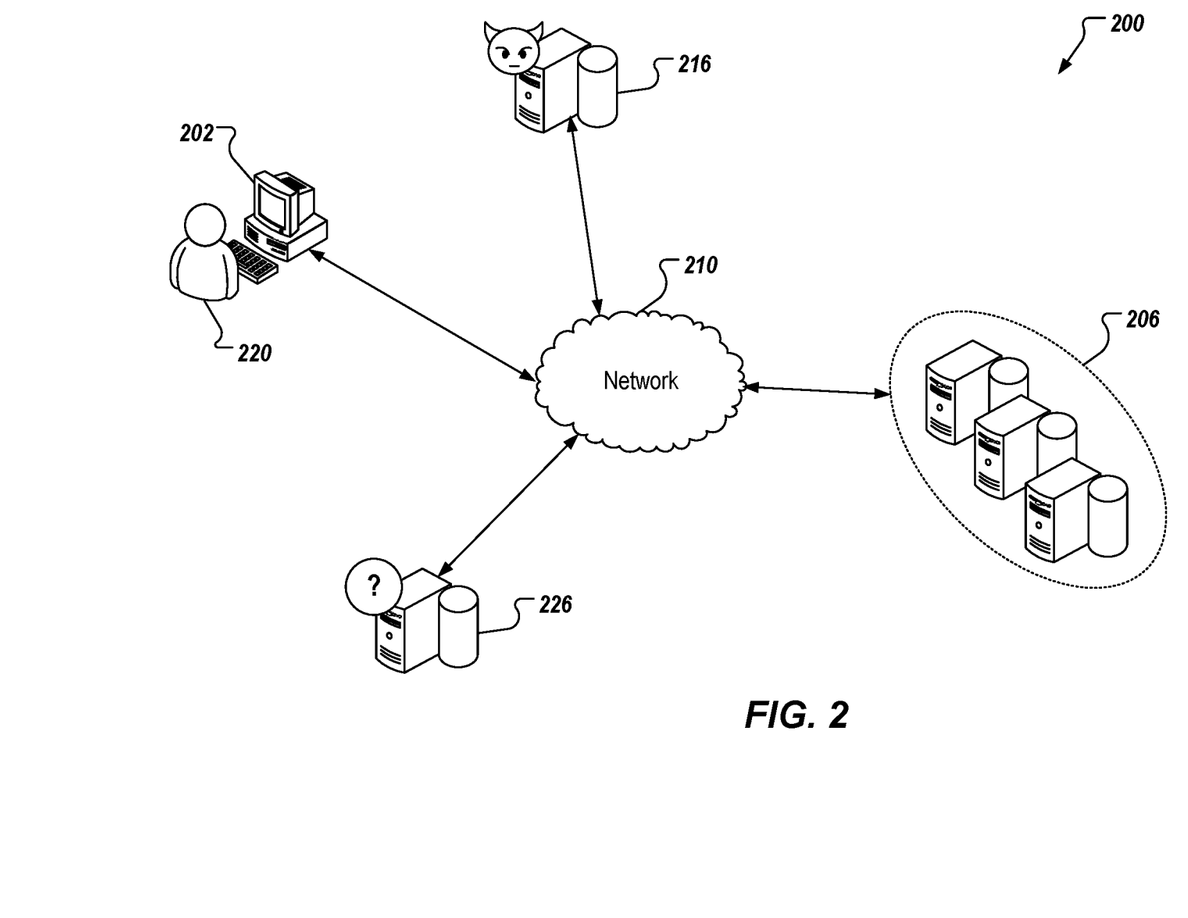
FIG. 2 depicts an example system that can execute implementations of the present disclosure.

FIG. 2 depicts an example system 200 that can execute implementations of the present disclosure. The example system 200 includes a computing device 202, back-end systems 206, 216, 226, and a network 210. In some examples, the network 210 includes a local area network (LAN), wide area network (WAN), the Internet, or a combination thereof, and connects web sites, devices (e.g., the computing device 202), and back-end systems (e.g., the back-end systems 206, 216, 226). In some examples, the network 210 can be accessed over a wired and/or a wireless communications link. For example, mobile computing devices, such as smartphones can utilize a cellular network to access the network 210.

In some examples, the computing device 202 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the back-end systems 206, 216, 226 each includes at least one server system, and data store (e.g., database). In some examples, the at least one server system hosts one or more computer-implemented services that can interact with other computing devices over the network 210.

In some implementations, the back-end system 206 represents an enterprise system that operates on behalf of an enterprise to conduct operations of the enterprise. In some examples, the back-end system 206 can be referred to as a host that hosts one or more applications used to conduct enterprise operations. In some examples, data of the enterprise and/or data of customers of the enterprise can be stored in the back-end system 206. In some examples, the back-end system 206 communicates with one or more hosts (e.g., that are external to the back-end system 206) to conduct enterprise operations. For example, the back-end system 206 can communicate with the one or more other hosts to send and/or retrieve data to/from the one or more hosts.

In the example of FIG. 2, the back-end system 216 represents a known malicious host. In some examples, the known malicious host is a host that has been identified as conducting malicious C&C activity and is included in a blacklist provided by a TI feed. In some examples, the blacklist includes a list of blacklisted Internet protocol (IP) addresses. In this example, an IP address of the back-end system 216 is included in the blacklist. Consequently, a firewall of the back-end system 216 can be configured to block communication between the back-end system 206 and the back-end system 216. In the example of FIG. 2, the back-end system 226 represents a host that is able to communicate with the back-end system 206. In some examples, an IP address of the back-end system 216 is not included in the blacklist and the firewall is not configured to block communication between the back-end system 206 and the back-end system 216.

In accordance with implementations of the present disclosure, the back-end system 206 can host a ZAM platform to identify potentially malicious hosts. As described in further detail herein, the ZAM platform includes a DL model that provides a representation of flow data with a known malicious host, such as the back-end system 216. In some examples, the representation is used to identify one or more potentially malicious hosts based on communication patterns with the one or more potentially malicious hosts. For example, a communication pattern between the back-end system 206 and the back-end system 226 can be determined to be sufficiently similar to one or more communication patterns between the back-end system 206 and one or more known malicious hosts, such as the back-end system 216. Consequently, the back-end system 226 can be identified as a potentially malicious host. In some implementations, one or more users are alerted to the identification of the one or more malicious hosts. For example, the ZAM platform can provide an alert to a user 220 that interacts with the computing device 202. In some implementations, a firewall of the back-end system 206 is automatically configured to block communications with the back-end system 226, because the back-end system 226 has been identified as a potentially malicious host.

Figure 3:
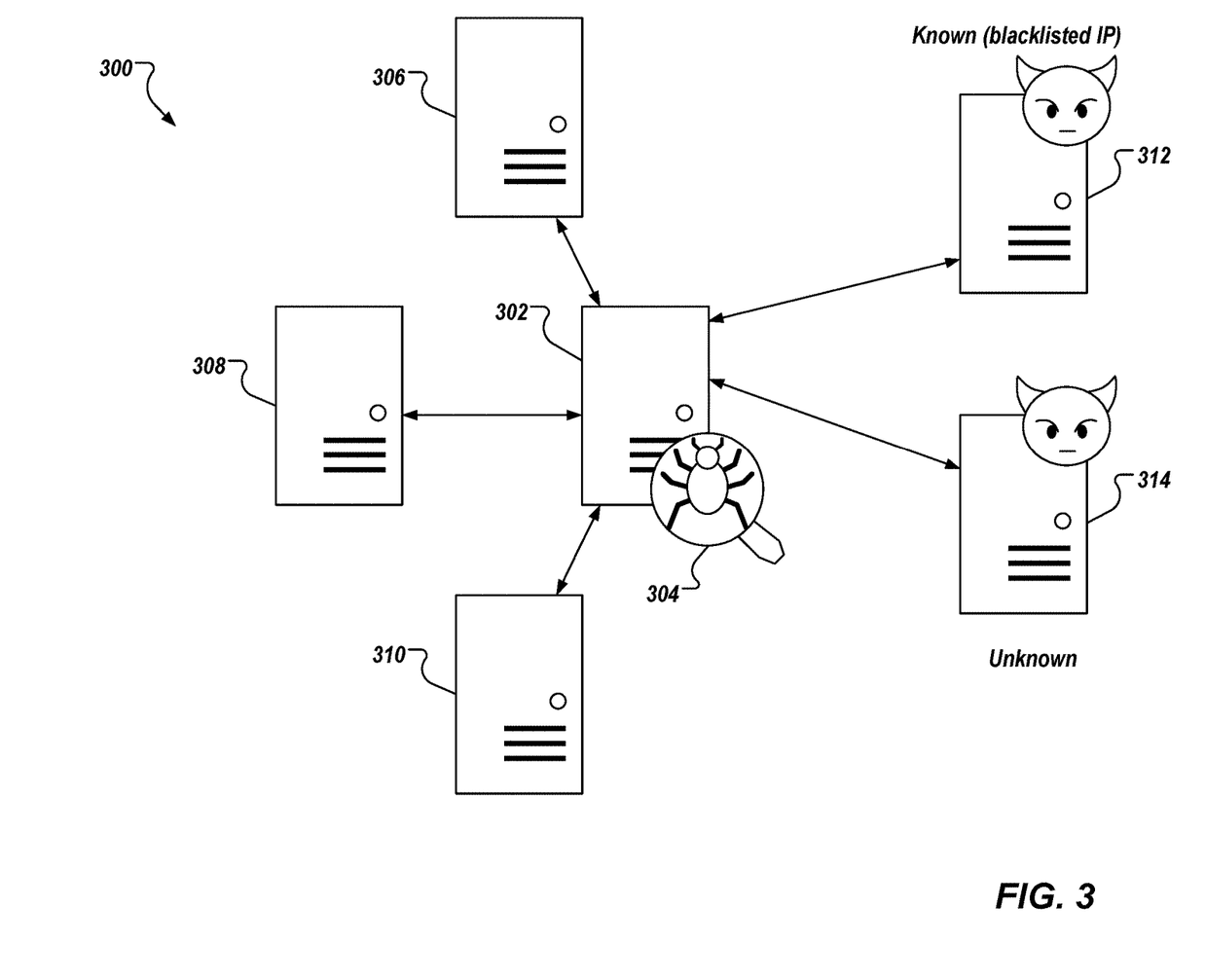
FIG. 3 depicts an example conceptual architecture depicting non-malicious hosts, known malicious hosts, and unknown malicious hosts.

FIG. 3 depicts an example conceptual architecture 300 depicting non-malicious hosts, known malicious hosts, and unknown malicious hosts. In the example of FIG. 3, a host 302 (e.g., a server system) is infected with one or more malware programs 304. In normal communication, the host 302 communicates with known, trusted systems 306, 308, 310 (also referred to as legitimate end-points with known IP addresses, or non-malicious hosts). As infected, the host 302 also communicates with a C&C 312 and a C&C 314. In the example of FIG. 3, the C&C 312 is known as a malicious device (i.e., a known malicious host). For example, an IP address of the C&C 312 can be provided in a blacklist (e.g., a list of blacklisted IP addresses). Consequently, the C&C 312 can be detected using traditional intelligence rules and/or look-up tables (e.g., provided by TI feeds) and can be blocked by a firewall of the host 302. However, the C&C 314 is unknown. For example, the C&C 314 is malicious and communicates with the host 302, but the IP address of the C&C 314 does not yet appear in any IP blacklist. Consequently, the C&C 314, at least initially, cannot be caught using traditional rule-based detection systems. As described in further detail herein, the ZDM platform of the present disclosure implements a DL model to detect instances of zero-day attacks to enable the firewall of the host 302 to be updated (in real-time) to block communication with unknown, but suspicious IP addresses, such as the C&C 314.

Figure 4:
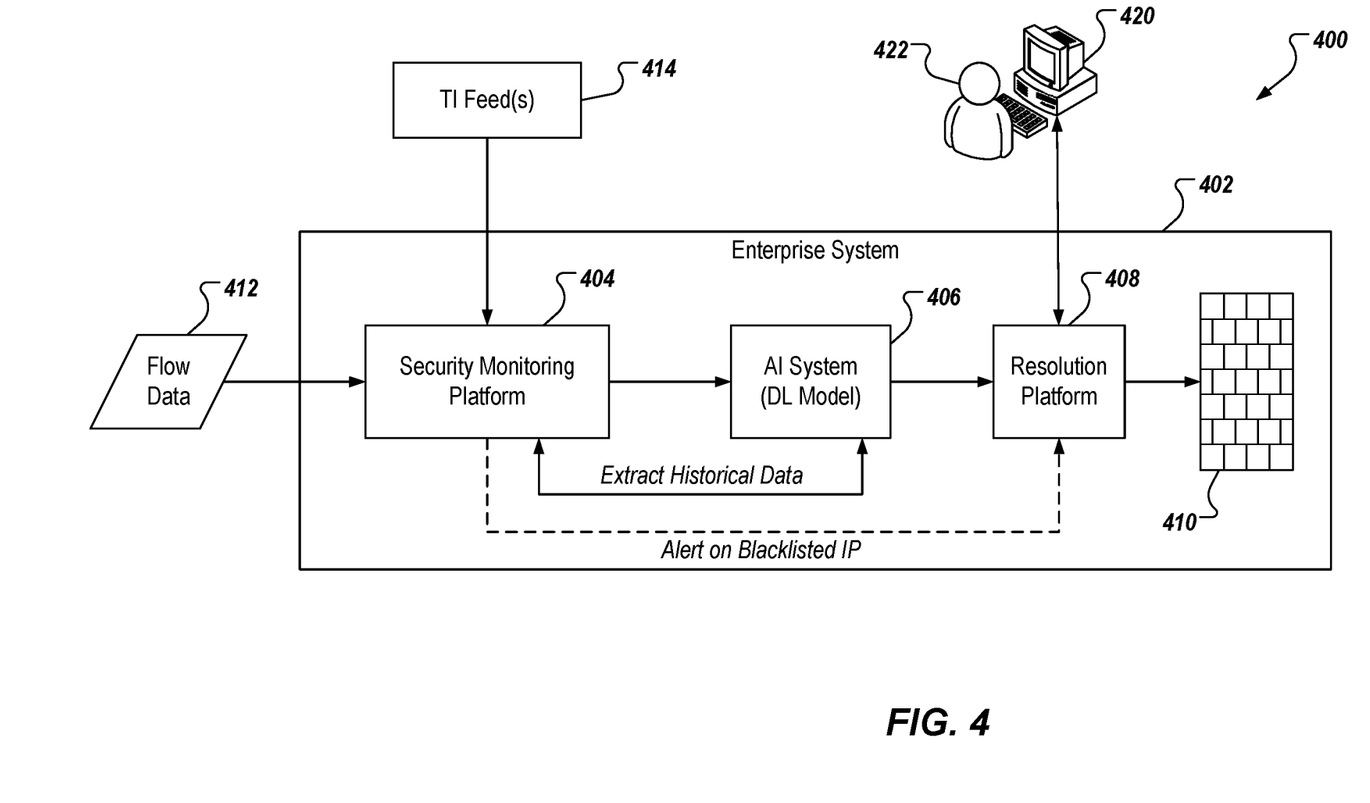
FIG. 4 depicts an example conceptual architecture in accordance with implementations of the present disclosure

Implementations of the present disclosure are described in further detail with reference to FIG. 4, which depicts an example conceptual architecture 400. In the example of FIG. 4, an enterprise system 402 is provided and includes a security monitoring platform 404, an AI system 406, a resolution platform 408, and a firewall system 410. In some implementations, the security monitoring platform 404 receives flow data 412 representative of communication between the enterprise system 402 and hosts (not depicted in FIG. 4). Although the flow data 412 is depicted in FIG. 4 as being received from outside of the enterprise system 402, in some examples, the flow data 412 can be provided from within the enterprise system 402. In some implementations, the security monitoring platform 404 receives security information from one or more TI feeds 414. In some examples, the security information includes one or more blacklists providing blacklisted IP addresses (e.g., IP addresses of known malicious hosts).

In some implementations, the security monitoring platform 404 is provided as a security information and event management (SIEM) platform. In some implementations, the SIEM platform combines security information management (SIM) and security event management (SEM). In some examples, the SIEM platform provides real-time analysis of security information and flow data, as described in further detail herein. Example SIEM platforms include, without limitation, Splunk Enterprise Security (ES) provided by Splunk Inc. of San Francisco, California, IBM QRadar SIEM provided by International Business Machines Corporation of Armonk, New York, and ArcSight SIEM provided by eSec Forte Technologies Pvt. Ltd. of New Dehli, India. It is contemplated that implementations of the present disclosure can be realized with any appropriate SIEM platform.

In some implementations, the AI system 406 identifies potential malicious hosts based on a DL model. In some examples, the DL model is provided as an autoencoder having multiple layers. In some examples, the autoencoder can be described as a neural network that is trained using unsupervised learning by applying backpropagation, where output values are to be equal to input values. In short, during training, the autoencoder learns a function that enables the input (e.g., network traffic) to be recreated as the output. In some examples, the DL model includes an embedding layer, an encoding layer, an encoded network traffic layer, and a decoding layer. In some examples, the embedding layer embeds the encoded network traffic in a multi-dimensional vector space. In some examples, the encoding layer is provided as a bidirectional long short-term memory (LSTM) encoder, and the decoding layer is provided as a bidirectional LSTM decoder. In general, the encoder-decoder layers can be collectively described as a recurrent neural network (RNN) that provides sequence-to-sequence prediction (e.g., forecasting next values in a sequence of values). In general, the encoding layer reads an input sequence from the embedding layer and encodes the input sequence into a fixed-length vector. The decoding layer decodes the fixed-length vector and outputs a predicted sequence as a high-dimensional vector.

In accordance with implementations of the present disclosure, network traffic between the enterprise system 402 and hosts is represented within the flow data 412. In some examples, the network traffic includes IP flows passing through networked components (e.g., the enterprise system 402 and the hosts). In some examples, the flow data 412 is provided based on the Internet Protocol Flow Information Export (IPFIX) protocol, which is provided by the Internet Engineering Task Force (IETF). The IPFIX protocol enables IP traffic flow information to be transmitted over a network (e.g., to the security monitoring platform 404). More particularly, in order to transmit IP traffic flow information (i.e., flow data) from an exporting process to a collecting process, a common representation of flow data and a standard means of communicating the flow data is required. IPFIX serves this purpose. It is contemplated, however, that implementations of the present disclosure can be realized using any appropriate protocol for communicating IP traffic flow.

In some examples, the flow data 412 is provided as a set of IP packets that have passed an observation point within the network during a certain time interval. All packets belonging to a particular data flow have a set of common properties. In some examples, each property is defined as the result of applying a function to one or more values. Example values include, without limitation, one or more packet header fields (e.g., destination IP address), transport header fields (e.g., destination port number), application header fields (e.g., RTP header fields), one or more characteristics of the packet itself (e.g., number of MPLS labels), one or more fields derived from packet treatment (e.g., next hop IP address, output interface). In some examples, a packet is defined as belonging to a flow, if the packet completely satisfies all defined properties of the flow. Accordingly, the range from a flow containing all packets observed at a network interface to a flow having just a single packet between two applications is accounted for. Each flow within the flow data 412 includes packets selected by a sampling mechanism.

In some examples, a flow record is provided for each flow within the flow data 412 and contains information about the respective flow that was observed at an observation point. In some examples, the flow record includes measured properties of the respective flow (e.g., the total number of bytes for all packets in the flow) and can include characteristic properties of the respective flow (e.g., source IP address). In some examples, a metering process generates flow records, and inputs to the metering process include packet headers and characteristics observed at an observation point, and packet treatment at the observation point (e.g., the selected output interface). In some examples, the metering process includes a set of functions that includes packet header capturing, timestamping, sampling, classifying, and maintaining flow records. Maintaining flow records can include creating new flow records, updating existing flow records, computing flow statistics, deriving flow properties, detecting flow expiration, passing flow records to an exporting process, and deleting flow records.

In some examples, the flow data 412 is provided in one or more messages (e.g., IPFIX messages). In some examples, each message originates at an exporting process, and carries the flow records of the exporting process. In some examples, each message is transmitted from the exporting process to a collecting process and is encapsulated at the transport layer. In some examples, the security monitoring platform 404 can include a collecting process that receives the flow data 412 from one or more exporting processes.

In accordance with implementations of the present disclosure, the security monitoring platform 404 compares IP addresses provided in the flow data 412 to blacklisted IP addresses provided from the TI feed(s) 414. In some implementations, if one or more IP addresses provided in the flow data 412 matches respective blacklisted IP addresses provided from the TI feed(s) 414, the security monitoring platform 404 issues an alert to the AI system 406. In some examples, the alert is provided as a message that includes the one or more IP addresses that are identified as blacklisted IP addresses. In response to receiving the alert, the AI system 406 retrieves historical flow data associated with each of the one or more IP addresses. For example, the AI system 406 requests (e.g., from the security monitoring platform 404) the last X hours (e.g., 24 hours) of flow data associated with each of the one or more IP addresses. The AI system 406 processes the historical flow data through the DL model to provide high-dimensional representations of the flow data (e.g., high-dimensional vectors) as encoded flow data.

In some implementations, the encoded flow data provided from the DL model is processed to provide a multi-dimensional flow representation for each host (i.e., each IP address) represented within the flow data 412. In some examples, a three-dimensional (3D) flow representation is provided for each host represented within the flow data 412. In some implementations, the multi-dimensional flow representation is generated using a dimensionality reduction technique on the output of the DL model. Example dimensionality reduction techniques include t-distributed stochastic neighbor embedding (t-SNE) and principal component analysis (PCA). It is contemplated, however, that any appropriate dimensionality reduction technique can be implemented to provide the multi-dimensional flow representation.

With particular reference to the example of t-SNE, t-SNE provides a non-linear technique for dimensionality reduction by calculating a probability of similarity of points in high-dimensional space and calculating a probability of similarity of points in low-dimensional space. The similarity of points is calculated as the conditional probability that a first point would choose a second point as its neighbor, if neighbors were picked in proportion to their probability density under a Gaussian (normal distribution) centered at the first point. t-SNE seeks to minimize a difference between the conditional probabilities in the high-dimensional and the low-dimensional space for a representation of the data in the lower-dimensional space. More plainly stated, t-SNE minimizes a divergence between a distribution that measures pairwise similarities of input objects and a distribution that measures pairwise similarities of corresponding low-dimensional points in an embedding.

With particular reference to the example of PCA, PCA provides a linear mapping of the high-dimensional representation provided by the DL model data to a lower-dimensional space, such that a variance in the lower-dimensional representation is maximized. In general, PCA achieves this by calculating eigenvectors from a covariance matrix, the eigenvectors representing the largest eigenvalues (the principal components) used to reconstruct a significant fraction of the variance of the high-dimensional representation. More plainly stated, PCA combines input features in a way that drops less important features, while retaining valuable parts of all of the features.

In some implementations, one or more multi-dimensional flow representations within the set of multi-dimensional flow representations are labeled based on known malicious hosts. That is, each multi-dimensional flow representation that is associated with a known malicious host is labeled as such (e.g., labeled as malicious). In this manner, the set of multi-dimensional flow representations can be divided into a sub-set of labeled multi-dimensional flow representations and a sub-set of unlabeled multi-dimensional flow representations.

In accordance with implementations of the present disclosure, unlabeled multi-dimensional flow representations in the sub-set of unlabeled multi-dimensional flow representations are classified in view of the sub-set of labeled multi-dimensional flow representations in an attempt to identify any potentially malicious hosts. More particularly, implementations of the present disclosure use clustering to classify unlabeled multi-dimensional flow representations in view of labeled multi-dimensional flow representations in the sub-set of labeled multi-dimensional flow representations. In some implementations, if an unlabeled multi-dimensional flow representation is clustered with at least one labeled multi-dimensional flow representation, the unlabeled multi-dimensional flow representation is identified as a potentially malicious host.

In some implementations, classifying of unlabeled multi-dimensional flow representations relative to labeled multi-dimensional flow representations is performed using k-nearest neighbor (k-NN) clustering. In some examples, the output of k-NN clustering for each multi-dimensional flow representation is a class membership. In the context of the present disclosure, example classes include non-malicious (e.g., benign) and malicious. In k-NN clustering, an object (e.g., a multi-dimensional flow representation) is classified by a plurality vote of its neighbors, with the object being assigned to the class most common among its k nearest neighbors. In some examples, k is a positive integer. If k=1, then the object is assigned to the class of the single nearest neighbor.

For example, a cluster can include an unlabeled multi-dimensional flow representation and one or more labeled multi-dimensional flow representations (e.g., k≥1). Consequently, the unlabeled multi-dimensional flow representation is classified with the label (e.g., malicious) of the labeled multi-dimensional flow representation. As another example, a cluster can include two or more unlabeled multi-dimensional flow representations and a labeled multi-dimensional flow representation (e.g., k=1). Consequently, none of the unlabeled multi-dimensional flow representations is classified with the label (e.g., malicious) of the labeled multi-dimensional flow representation. That is, the two or more unlabeled multi-dimensional flow representations remain unlabeled. As another example, a cluster can include two or more unlabeled multi-dimensional flow representations and two or more labeled multi-dimensional flow representations (e.g., k≥2). If the number of labeled multi-dimensional flow representations meets or exceeds the number of unlabeled multi-dimensional flow representations, the unlabeled multi-dimensional flow representations are classified with the label (e.g., malicious) of the labeled multi-dimensional flow representations. If the number of labeled multi-dimensional spatial flow representations is less than the number of unlabeled multi-dimensional flow representations, the unlabeled multi-dimensional flow representations remain unlabeled. In some implementations, if an unlabeled multi-dimensional flow representation is to be assigned a label (e.g., malicious), the IP address associated with the unlabeled multi-dimensional flow representation is identified as a potentially malicious host.

In the example of FIG. 4, the AI-based system 406 triggers the resolution platform 408 to take remedial action in response to one or more potentially malicious hosts identified by the AI system 406. In some examples, remedial action can include notifying a user 422 by transmitting a notification to a computing device 420. For example, the notification can inform the user 422 of the known malicious host (e.g., the blacklisted IP address) and/or the one or more potentially malicious hosts and can provide relevant information (e.g., IP address(es)). In some examples, the user 422 can interact with the resolution platform 408 through the computing device 402. For example, the user 422 can confirm whether any of the one or more potentially malicious hosts is indeed malicious, and/or request additional information regarding any of the one or more potentially malicious hosts from the resolution platform.

In some implementations, the resolution platform 408 can automatically adjust a configuration of the firewall system 410 in response to identification of the known malicious host and/or the one or more potentially malicious hosts. In some examples, the resolution platform 408 adjusts the firewall system 410 to block any communication with the known malicious host and one or more of the one or more potentially malicious hosts. In some examples, the resolution platform 408 adjusts the firewall system 410 to limit types of communication with one or more of the one or more potentially malicious hosts. For example, the firewall 410 can inhibit outgoing messages to any of the one or more potentially malicious hosts that contain data (e.g., to enable limited communication, but prohibit data exfiltration). In some examples, the resolution platform 408 adjusts the firewall system 410 to quarantine messages received from one or more of the one or more potentially malicious hosts.

In some implementations, the resolution platform 408 can adjust a configuration of the firewall system 410 in response to input received from the user 422. For example, in response to the user 422 confirming that a potentially malicious host is indeed a malicious host, the resolution platform 408 can adjust the configuration to permanently prohibit any communication with the malicious host. As another example, in response to the user 422 confirming that a potentially malicious host is not a malicious host, the resolution platform 408 can adjust the configuration to enable communication with the host.

Figure 5:
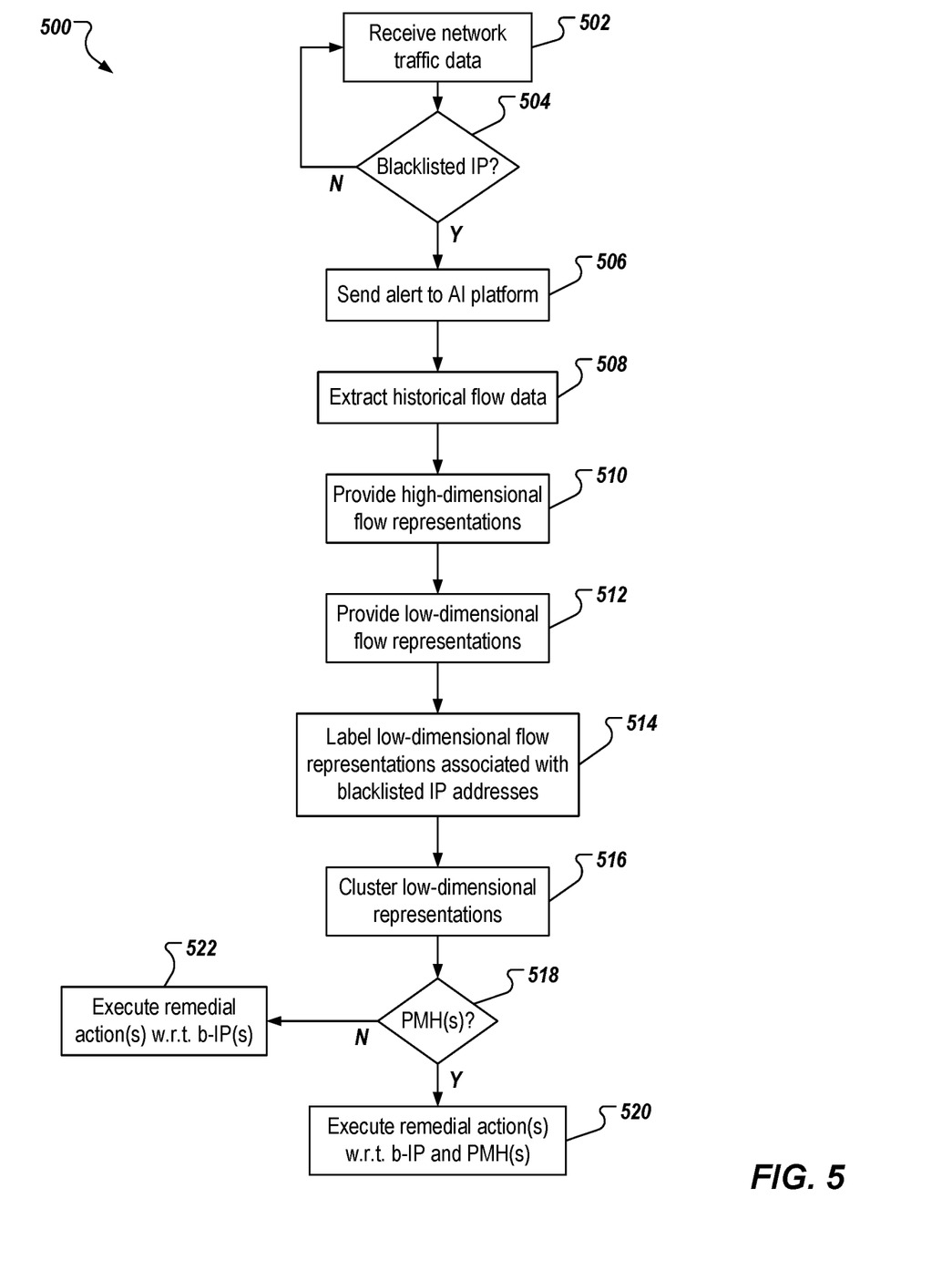
FIG. 5 depicts an example process that can be executed in implementations of the present disclosure.

FIG. 5 depicts an example process 500 that can be executed in implementations of the present disclosure. In some examples, the example process 500 is provided using one or more computer-executable programs executed by one or more computing devices (e.g., the back-end system 206 of FIG. 2).

Network traffic data is received (502). For example, the security monitoring platform 404 receives the flow data 412 and the threat information (e.g., from the one or more TI feeds 414). In some examples, the security monitoring platform 404 periodically receives the flow data 412 (e.g., every Y seconds). In some examples, the security monitoring platform 404 requests the flow data 412. In some examples, the security monitoring platform 404 periodically receives the threat information (e.g., every Z seconds). In some examples, the security monitoring platform 404 receives the threat information in response to a change (e.g., one or more blacklisted IP addresses are added to the threat information).

It is determined whether any blacklisted IP addresses are included in the network traffic data (504). For example, the security monitoring platform 404 compares external IP addresses provided in the flow data 412 to blacklisted IP addresses provided in the threat information. If there are no blacklisted IP addresses in the network traffic data, the example process 500 loops back.

If there are one or more blacklisted IP addresses in the network traffic data, an alert is provided (506). In some examples, the security monitoring platform 404 provides an alert to the resolution platform 408 regarding the one or more blacklisted IP addresses and, in response, the resolution platform 408 automatically configures the firewall system 410 to block each of the one or more blacklisted IP addresses. In accordance with implementations of the present disclosure, the security platform alerts the AI system 406 that the one or more blacklisted IP addresses have been identified. Historical flow data is extracted (508). For example, in response to the alert that the one or more blacklisted IP addresses have been identified, the AI system 406 requests historical flow data (e.g., the last X hours of flow data). For example, the AI system 406 requests (e.g., from the security monitoring platform 404) the last 24 hours of flow data for the enterprise system 402 (e.g., all IP addresses communicating to/from the enterprise system 402).

High-dimensional flow representations are provided (510). For example, and as described herein, the AI system 406 process the historical flow data through the DL model, which provides the high-dimensional flow representations. Low-dimensional flow representations are provided (512). For example, and as described herein, the high-dimensional flow representations are processed (e.g., through the AI system 406) using a dimensionality reduction technique (e.g., t-SNE, PCA) to provide the low-dimensional flow representations (e.g., 3D flow representations).

Low-dimensional flow representations are labeled (514). For example, any low-dimensional flow representation that is associated with a blacklisted IP address is labeled (e.g., by the AI system 406) as such (e.g., labeled as malicious). In this manner, the set of low-dimensional flow representations includes a sub-set of labeled low-dimensional flow representations and a sub-set of unlabeled low-dimensional flow representations. Low-dimensional flow representations are clustered (516). For example, k-NN clustering is executed (e.g., by the AI system 406) over the set of low-dimensional flow representations to cluster the low-dimensional flow representations. It is determined whether any potentially malicious hosts (PMHs) are identified (518). For example, it is determined (e.g., by the AI system 406) whether any potentially malicious hosts based on the clusters provided from the k-NN clustering as described in detail herein. In some examples, an unlabeled low-dimensional flow representation is classified as potentially malicious based on being clustered with one or more labeled low-dimensional flow representations.

If one or more potentially malicious hosts are identified, one or more remedial actions are executed with respect to (w.r.t.) the blacklisted IP address (b-IP) and the one or potentially malicious hosts (520). For example, the AI system 406 alerts the resolution platform 408 regarding malicious hosts and/or potentially malicious hosts and the resolution platform 408 configures the firewall system 410 in response. In some examples, if the security monitoring platform 406 has not already notified the resolution platform 408 of the blacklisted IP address and action taken with respect to the blacklisted IP address, the AI system 406 notifies the resolution platform of the blacklisted IP address, and action is taken. If one or more potentially malicious hosts are identified, one or more remedial actions are executed with respect to the blacklisted IP address (522). For example, if the security monitoring platform 404 has not already notified the resolution platform 408 of the blacklisted IP address and action taken with respect to the blacklisted IP address, the AI system 406 notifies the resolution platform of the blacklisted IP address, and action is taken.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for identifying and remediating zero-day attacks on a network, the method being executed by one or more processors and comprising:
  receiving flow data representative of communication traffic of the network;
  determining that at least one blacklisted Internet protocol (IP) address is present in the flow data, the at least one blacklisted IP address representing a known malicious host, and in response:
    retrieving historical flow data for the at least one blacklisted IP address, the historical flow data representing flow data associated with the at least one blacklisted IP address for a time period prior to determining that the at least one blacklisted IP address is present in the flow data,
    providing a set of high-dimensional flow representations of network traffic by processing the historical flow data through a deep learning (DL) model, each high-dimensional flow representation in the set of high-dimensional flow representations comprising a high-dimensional vector representing a host within the historical flow data, the set of high-dimensional flow representations including all hosts represented within the historical flow data,
    providing a set of low-dimensional flow representations of the network traffic from the set of high-dimensional flow representations by reducing dimensions of the high-dimensional flow representations in the set of high-dimensional flow representations, at least one low-dimensional flow representation representing the known malicious host within the network traffic and at least one low-dimensional flow representation representing an unknown malicious host within the network traffic, and
    labeling at least a portion of the set of low-dimensional flow representations to provide a sub-set of labeled low-dimensional flow representations and a sub-set of unlabeled low-dimensional flow representations, each labeled low-dimensional flow representation representing a respective known malicious host; and
  identifying a host associated with an unlabeled low-dimensional flow representation as a potentially malicious host by clustering the unlabeled low-dimensional flow representations in the sub-set of unlabeled low-dimensional flow representations in view of the labeled low-dimensional flow representations in the sub-set of the labeled low-dimensional flow representations, and in response, automatically executing a remedial action with respect to the potentially malicious host.

2. The method of claim 1, wherein providing a set of low-dimensional flow representations of the network traffic based on the set of high-dimensional flow representations comprises processing the set of high-dimensional flow representations using one of t-distributed stochastic neighbor embedding (t-SNE) and principal component analysis (PCA) to provide the set of low-dimensional flow representations.

3. The method of claim 1, wherein identifying a host associated with an unlabeled low-dimensional flow representation as a potentially malicious host comprises:
   executing k-nearest neighbor (k-NN) clustering over the sub-set of labeled low-dimensional flow representations and the sub-set of unlabeled low-dimensional flow representations; and
   classifying the unlabeled low-dimensional flow representation as potentially malicious in response to the unlabeled low-dimensional flow representation being clustered with one or more labeled low-dimensional flow representations.

4. The method of claim 1, wherein labeling at least a portion of the set of low-dimensional flow representations comprises determining that a low-dimensional flow representation is associated with a known malicious host and, in response, labeling the low-dimensional flow representation to provide a labeled low-dimensional flow representation included in the sub-set of labeled low-dimensional flow representations.

5. The method of claim 1, wherein determining that at least one blacklisted IP address is present in the flow data comprises:
   receiving threat information from one or more threat information (TI) feeds;
   comparing blacklisted IP addresses in a set of blacklisted IP addresses provided in the threat information to IP addresses included in the flow data; and
   determining that an IP address included in the flow data matches a blacklisted IP address.

6. The method of claim 1, further comprising extracting the historical flow data in response to determining that the at least one blacklisted IP address is present in the flow data.

7. The method of claim 1, wherein automatically executing a remedial action with respect to the potentially malicious host comprises configuring a firewall system to at least partially block communication with the potentially malicious host.

8. The method of claim 1, wherein each low-dimensional flow representation comprises a three-dimensional (3D) flow representation.

9. A non-transitory computer-readable storage medium coupled to one or more processors and having instructions stored thereon which, when executed by the one or more processors, cause the one or more processors to perform operations for identifying and remediating zero-day attacks on a network, the operations comprising:
   receiving flow data representative of communication traffic of the network;
   determining that at least one blacklisted Internet protocol (IP) address is present in the flow data, the at least one blacklisted IP address representing a known malicious host, and in response:
      retrieving historical flow data for the at least one blacklisted IP address, the historical flow data representing flow data associated with the at least one blacklisted IP address for a time period prior to determining that the at least one blacklisted IP address is present in the flow data,
      providing a set of high-dimensional flow representations of network traffic by processing the historical flow data through a deep learning (DL) model, each high-dimensional flow representation in the set of high-dimensional flow representations comprising a high-dimensional vector representing a host within the historical flow data, the set of high-dimensional flow representations including all hosts represented within the historical flow data,
      providing a set of low-dimensional flow representations of the network traffic from the set of high-dimensional flow representations by reducing dimensions of the high-dimensional flow representations in the set of high-dimensional flow representations, at least one low-dimensional flow representation representing the known malicious host within the network traffic and at least one low-dimensional flow representation representing an unknown malicious host within the network traffic, and
      labeling at least a portion of the set of low-dimensional flow representations to provide a sub-set of labeled low-dimensional flow representations and a sub-set of unlabeled low-dimensional flow representations, each labeled low-dimensional flow representation representing a respective known malicious host; and
   identifying a host associated with an unlabeled low-dimensional flow representation as a potentially malicious host by clustering the unlabeled low-dimensional flow representations in the sub-set of unlabeled low-dimensional flow representations in view of the labeled low-dimensional flow representations in the sub-set of the labeled low-dimensional flow representations, and in response, automatically executing a remedial action with respect to the potentially malicious host.

10. The computer-readable storage medium of claim 9, wherein providing a set of low-dimensional flow representations of the network traffic based on the set of high-dimensional flow representations comprises processing the set of high-dimensional flow representations using one of t-distributed stochastic neighbor embedding (t-SNE) and principal component analysis (PCA) to provide the set of low-dimensional flow representations.

11. The computer-readable storage medium of claim 9, wherein identifying a host associated with an unlabeled low-dimensional flow representation as a potentially malicious host comprises:
   executing k-nearest neighbor (k-NN) clustering over the sub-set of labeled low-dimensional flow representations and the sub-set of unlabeled low-dimensional flow representations; and
   classifying the unlabeled low-dimensional flow representation as potentially malicious in response to the unlabeled low-dimensional flow representation being clustered with one or more labeled low-dimensional flow representations.

12. The computer-readable storage medium of claim 9, wherein labeling at least a portion of the set of low-dimensional flow representations comprises determining that a low-dimensional flow representation is associated with a known malicious host and, in response, labeling the low-dimensional flow representation to provide a labeled low-dimensional flow representation included in the sub-set of labeled low-dimensional flow representations.

13. The computer-readable storage medium of claim 9, wherein determining that at least one blacklisted IP address is present in the flow data comprises:

receiving threat information from one or more threat information (TI) feeds;

comparing blacklisted IP addresses in a set of blacklisted IP addresses provided in the threat information to IP addresses included in the flow data; and determining that an IP address included in the flow data matches a blacklisted IP address.

14. The computer-readable storage medium of claim 9, wherein operations further include extracting the historical flow data in response to determining that the at least one blacklisted IP address is present in the flow data.

15. The computer-readable storage medium of claim 9, wherein automatically executing a remedial action with respect to the potentially malicious host comprises configuring a firewall system to at least partially block communication with the potentially malicious host.

16. The computer-readable storage medium of claim 9, wherein each low-dimensional flow representation comprises a three-dimensional (3D) flow representation.

17. A system, comprising:

one or more processors; and a computer-readable storage device coupled to the one or more processors and having instructions stored thereon which, when executed by the one or more processors, cause the one or more processors to perform operations for identifying and remediating zero-day attacks on a network, the operations comprising:

receiving flow data representative of communication traffic of the network;

determining that at least one blacklisted Internet protocol (IP) address is present in the flow data, the at least one blacklisted IP address representing a known malicious host, and in response:

retrieving historical flow data for the at least one blacklisted IP address, the historical flow data representing flow data associated with the at least one blacklisted IP address for a time period prior to determining that the at least one blacklisted IP address is present in the flow data, providing a set of high-dimensional flow representations of network traffic by processing the historical flow data through a deep learning (DL) model, each high-dimensional flow representation in the set of high-dimensional flow representations comprising a high-dimensional vector representing a host within the historical flow data, the set of high-dimensional flow representations including all hosts represented within the historical flow data, providing a set of low-dimensional flow representations of the network traffic from the set of high-dimensional flow representations by reducing dimensions of the high-dimensional flow representations in the set of high-dimensional flow representations, at least one low-dimensional flow representation representing the known malicious host within the network traffic and at least one low-dimensional flow representation representing an unknown malicious host within the network traffic, and labeling at least a portion of the set of low-dimensional flow representations to provide a sub-set of labeled low-dimensional flow representations and a sub-set of unlabeled low-dimensional flow representations, each labeled low-dimensional flow representation representing a respective known malicious host; and identifying a host associated with an unlabeled low-dimensional flow representation as a potentially malicious host by clustering the unlabeled low-dimensional flow representations in the sub-set of unlabeled low-dimensional flow representations in view of the labeled low-dimensional flow representations in the sub-set of the labeled low-dimensional flow representations, and in response, automatically executing a remedial action with respect to the potentially malicious host.

18. The system of claim 17, wherein providing a set of low-dimensional flow representations of the network traffic based on the set of high-dimensional flow representations comprises processing the set of high-dimensional flow representations using one of t-distributed stochastic neighbor embedding (t-SNE) and principal component analysis (PCA) to provide the set of low-dimensional flow representations.

19. The system of claim 17, wherein identifying a host associated with an unlabeled low-dimensional flow representation as a potentially malicious host comprises:

executing k-nearest neighbor (k-NN) clustering over the sub-set of labeled low-dimensional flow representations and the sub-set of unlabeled low-dimensional flow representations; and classifying the unlabeled low-dimensional flow representation as potentially malicious in response to the unlabeled low-dimensional flow representation being clustered with one or more labeled low-dimensional flow representations.

20. The system of claim 17, wherein labeling at least a portion of the set of low-dimensional flow representations comprises determining that a low-dimensional flow representation is associated with a known malicious host and, in response, labeling the low-dimensional flow representation to provide a labeled low-dimensional flow representation included in the sub-set of labeled low-dimensional flow representations.

21. The system of claim 17, wherein determining that at least one blacklisted IP address is present in the flow data comprises:

receiving threat information from one or more threat information (TI) feeds;

comparing blacklisted IP addresses in a set of blacklisted IP addresses provided in the threat information to IP addresses included in the flow data; and determining that an IP address included in the flow data matches a blacklisted IP address.

22. The system of claim 17, wherein operations further include extracting the historical flow data in response to determining that the at least one blacklisted IP address is present in the flow data.

23. The system of claim 17, wherein automatically executing a remedial action with respect to the potentially malicious host comprises configuring a firewall system to at least partially block communication with the potentially malicious host.

24. The system of claim 17, wherein each low-dimensional flow representation comprises a three-dimensional (3D) flow representation.

* * * * *